US009267778B2

(12) United States Patent
Burch et al.

(10) Patent No.: US 9,267,778 B2
(45) Date of Patent: Feb. 23, 2016

(54) TAPE MEASURE

(71) Applicant: Milwaukee Electric Tool Corporation, Brookfield, WI (US)

(72) Inventors: Wade F. Burch, Wauwatosa, WI (US); Andrew G. Wagner, Lisbon, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 189 days.

(21) Appl. No.: 13/743,532

(22) Filed: Jan. 17, 2013

(65) Prior Publication Data

US 2013/0185949 A1 Jul. 25, 2013

Related U.S. Application Data

(60) Provisional application No. 61/588,459, filed on Jan. 19, 2012.

(51) Int. Cl.
*G01B 3/10* (2006.01)

(52) U.S. Cl.
CPC ...... *G01B 3/1061* (2013.01); *G01B 2003/1087* (2013.01)

(58) Field of Classification Search
CPC ........... F41G 1/345; F41G 1/467; F41G 1/02; F41G 1/30; G01B 3/1082; G01B 11/03; G01B 11/24; G01B 11/27; G01B 1/00; G01B 11/303; G01B 2003/1015; G01B 3/004; G01B 3/006; G01B 3/02; G01B 3/04; G01B 3/1005; G01B 3/1041; G01B 3/12; G01B 3/46; G01B 3/566; G01B 11/02; G01B 2003/1087; G01B 2003/1089; G01B 2003/1097; G01B 3/10; G01B 3/1061; G01B 3/1084; G01B 3/18; G01B 3/20; G01B 5/0025; G01B 5/004; G01B 5/143

USPC .................................................. 33/761, 768
See application file for complete search history.

(56) References Cited

U.S. PATENT DOCUMENTS

| 14,947 A | 5/1856 | Buck et al. |
| 1,303,756 A | 5/1919 | Ballou |

(Continued)

FOREIGN PATENT DOCUMENTS

| CN | 2174684 | 8/1994 |
| DE | 102006058396 A1 | 7/2008 |

(Continued)

OTHER PUBLICATIONS

Hyun-Kyu Ko, "A Study on Design of Measure Tape for Home Use (for DYI)" (1996) Master's Thesis-Kyung Sung University, Graduate School of Industry, Department of Industrial Design, 658.04 4 (81 pages with English translation).

*Primary Examiner* — Yaritza Guadalupe-McCall
(74) *Attorney, Agent, or Firm* — Michael Best & Friedrich LLP

(57) ABSTRACT

A tape measure includes a housing assembly having a first side wall, a second side wall, and a peripheral wall extending from the first side wall to the second side wall. The housing assembly defines a cavity, and the peripheral wall defines a bottom surface and a tape port. A measuring tape is rotatably supported by the housing. At least a portion of the measuring tape forms a spool disposed within the cavity. The measuring tape extends and retracts from the cavity through the tape port. A hook member is fixedly coupled to an end portion of the measuring tape. A first lamp is coupled to the housing assembly and is oriented to illuminate a portion of the measuring tape.

15 Claims, 3 Drawing Sheets

(56) References Cited

U.S. PATENT DOCUMENTS

| | | | |
|---|---|---|---|
| 1,613,676 A | 1/1927 | Raphael | |
| 2,052,259 A | 8/1936 | Stowell | |
| 2,156,905 A | 5/1939 | Stowell et al. | |
| 2,341,583 A * | 2/1944 | Tuve | 250/462.1 |
| 2,563,191 A * | 8/1951 | Russ | 33/429 |
| 2,574,272 A | 11/1951 | McCully | |
| 2,614,769 A | 10/1952 | Nicholson | |
| 2,683,933 A | 7/1954 | McFarland | |
| 2,816,369 A | 12/1957 | Becker | |
| 2,994,958 A | 8/1961 | Beeber | |
| 3,100,937 A | 8/1963 | Burch | |
| 3,164,907 A | 1/1965 | Quenot | |
| 3,214,836 A | 11/1965 | West | |
| 3,499,225 A | 3/1970 | Darrah | |
| 3,499,612 A | 3/1970 | Zelnick | |
| 3,519,219 A | 7/1970 | Zelnick | |
| 3,519,220 A | 7/1970 | Zelnick | |
| 3,521,831 A | 7/1970 | Schmidt | |
| 3,570,782 A | 3/1971 | Hayes | |
| 3,577,641 A | 5/1971 | Smith | |
| 3,578,259 A | 5/1971 | Zelnick | |
| 3,672,597 A | 6/1972 | Williamson | |
| 3,713,603 A | 1/1973 | Shore | |
| 3,716,201 A | 2/1973 | West | |
| 3,816,925 A | 6/1974 | Hogan et al. | |
| 3,838,520 A | 10/1974 | Quenot | |
| 3,869,096 A | 3/1975 | Hogan et al. | |
| 3,874,608 A | 4/1975 | Quenot | |
| 3,905,114 A | 9/1975 | Rutty | |
| 3,908,277 A | 9/1975 | Rutty | |
| 3,918,657 A | 11/1975 | Hawker et al. | |
| 3,942,738 A | 3/1976 | Rutty | |
| 4,067,513 A | 1/1978 | Rutty et al. | |
| 4,077,128 A | 3/1978 | Stoutenberg | |
| D247,878 S | 5/1978 | Covey | |
| 4,103,426 A | 8/1978 | Robin | |
| 4,121,785 A | 10/1978 | Quenot | |
| 4,131,244 A | 12/1978 | Quenot | |
| 4,142,693 A | 3/1979 | Czerwinski | |
| 4,149,320 A | 4/1979 | Troyer et al. | |
| 4,153,996 A | 5/1979 | Rutty | |
| 4,161,781 A | 7/1979 | Hildebrandt et al. | |
| 4,164,334 A | 8/1979 | Rathbun et al. | |
| 4,164,816 A | 8/1979 | Bergkvist | |
| D253,876 S | 1/1980 | Covey | |
| D253,877 S | 1/1980 | Covey et al. | |
| 4,186,490 A | 2/1980 | Quenot | |
| 4,200,983 A | 5/1980 | West et al. | |
| 4,215,828 A | 8/1980 | Rathbun et al. | |
| 4,215,829 A | 8/1980 | Boyllin | |
| D256,894 S | 9/1980 | Bruno | |
| D257,008 S | 9/1980 | Hildebrandt | |
| 4,286,387 A | 9/1981 | Di Diego | |
| 4,288,923 A | 9/1981 | Duda | |
| 4,363,171 A | 12/1982 | Scandella | |
| 4,411,072 A | 10/1983 | Rutty et al. | |
| 4,427,883 A | 1/1984 | Betensky et al. | |
| 4,429,462 A | 2/1984 | Rutty et al. | |
| 4,433,486 A | 2/1984 | Muehlenbein | |
| 4,434,952 A | 3/1984 | Czerwinski et al. | |
| 4,449,302 A | 5/1984 | Drechsler et al. | |
| 4,462,160 A | 7/1984 | Cohen et al. | |
| 4,476,635 A | 10/1984 | Hart | |
| 4,479,617 A | 10/1984 | Edwards | |
| 4,487,379 A | 12/1984 | Drechsler et al. | |
| 4,489,494 A | 12/1984 | Duda | |
| 4,516,325 A | 5/1985 | Cohen et al. | |
| D279,553 S | 7/1985 | Drechsler | |
| 4,527,334 A | 7/1985 | Jones et al. | |
| 4,547,969 A | 10/1985 | Haack | |
| 4,574,486 A | 3/1986 | Drechsler | |
| 4,578,867 A | 4/1986 | Czerwinski et al. | |
| 4,580,347 A * | 4/1986 | McKnight | 33/760 |
| 4,583,294 A | 4/1986 | Hutchins et al. | |
| 4,603,481 A | 8/1986 | Cohen et al. | |
| 4,619,020 A | 10/1986 | Lecher, Sr. | |
| 4,748,746 A | 6/1988 | Jacoff | |
| 4,811,489 A | 3/1989 | Walker | |
| 4,860,901 A | 8/1989 | Hochreuther et al. | |
| 4,896,280 A | 1/1990 | Phillips | |
| 4,930,227 A | 6/1990 | Ketchpel | |
| 4,965,941 A | 10/1990 | Agostinacci | |
| 4,972,601 A | 11/1990 | Bickford et al. | |
| 4,982,910 A | 1/1991 | Bickford | |
| 4,998,356 A | 3/1991 | Chapin | |
| 5,010,657 A | 4/1991 | Knapp | |
| 5,038,985 A | 8/1991 | Chapin | |
| 5,046,339 A | 9/1991 | Krell | |
| 5,062,215 A | 11/1991 | Schlitt | |
| 5,101,569 A * | 4/1992 | Watkins | 33/203 |
| 5,134,784 A | 8/1992 | Atienza | |
| D333,628 S | 3/1993 | Piotrkowski | |
| 5,189,801 A | 3/1993 | Nicely | |
| 5,208,767 A | 5/1993 | George-Kelso et al. | |
| 5,210,956 A | 5/1993 | Knispel et al. | |
| 5,230,158 A | 7/1993 | Wall | |
| D342,210 S | 12/1993 | Grossman | |
| D342,459 S | 12/1993 | Shen | |
| D342,687 S | 12/1993 | Kang | |
| 5,335,421 A | 8/1994 | Jones, Jr. | |
| D350,703 S | 9/1994 | Fifer | |
| 5,367,785 A | 11/1994 | Benarroch | |
| 5,381,318 A * | 1/1995 | Fang | 33/760 |
| 5,430,952 A * | 7/1995 | Betts | 33/760 |
| 5,448,837 A | 9/1995 | Hang-Teng | |
| D365,769 S | 1/1996 | Kang | |
| 5,481,813 A | 1/1996 | Templeton | |
| 5,506,378 A | 4/1996 | Goldenberg | |
| 5,531,395 A | 7/1996 | Hsu | |
| 5,542,184 A | 8/1996 | Beard | |
| D375,269 S | 11/1996 | Wertheim | |
| 5,575,077 A | 11/1996 | Tae | |
| 5,600,894 A | 2/1997 | Blackman et al. | |
| 5,659,970 A | 8/1997 | Reedy | |
| 5,699,623 A | 12/1997 | Lee | |
| 5,746,004 A | 5/1998 | Wertheim | |
| D396,816 S | 8/1998 | Kang | |
| D397,304 S | 8/1998 | Kang | |
| 5,791,581 A | 8/1998 | Loeffler et al. | |
| 5,794,357 A | 8/1998 | Gilliam et al. | |
| D397,626 S | 9/1998 | Davis | |
| D397,950 S | 9/1998 | Blackman | |
| 5,806,202 A | 9/1998 | Blackman et al. | |
| 5,815,940 A | 10/1998 | Valentine, Sr. | |
| 5,820,057 A | 10/1998 | Decarolis et al. | |
| 5,829,152 A | 11/1998 | Potter et al. | |
| D402,216 S | 12/1998 | Gilliam | |
| 5,842,284 A | 12/1998 | Goldman | |
| 5,875,557 A | 3/1999 | Ueki | |
| 5,884,408 A | 3/1999 | Simmons | |
| 5,894,677 A | 4/1999 | Hoffman | |
| 5,895,539 A | 4/1999 | Hsu | |
| D409,104 S | 5/1999 | Yang | |
| 5,913,586 A | 6/1999 | Marshall | |
| 5,922,999 A | 7/1999 | Yang | |
| D412,858 S | 8/1999 | Staton | |
| 5,990,435 A | 11/1999 | Chao | |
| 6,011,472 A | 1/2000 | Pendergraph | |
| D420,606 S | 2/2000 | Hsu | |
| D421,230 S | 2/2000 | Gilliam | |
| 6,026,585 A | 2/2000 | Li | |
| 6,032,379 A | 3/2000 | Usami | |
| D423,382 S | 4/2000 | Piotrkowski | |
| 6,052,914 A | 4/2000 | Soon | |
| D424,454 S | 5/2000 | Ikeda | |
| 6,082,017 A | 7/2000 | Simar | |
| 6,085,433 A | 7/2000 | Li | |
| 6,098,303 A | 8/2000 | Vogel | |
| 6,108,926 A | 8/2000 | Fraser et al. | |
| 6,115,933 A | 9/2000 | Li | |
| RE36,887 E | 10/2000 | Goldman | |
| 6,148,534 A | 11/2000 | Li | |
| 6,161,299 A | 12/2000 | Lin | |
| 6,167,635 B1 | 1/2001 | Lin | |

(56) References Cited

U.S. PATENT DOCUMENTS

| | | |
|---|---|---|
| 6,178,655 B1 | 1/2001 | Potter et al. |
| D438,478 S | 3/2001 | Lin |
| D439,531 S | 3/2001 | Davis et al. |
| 6,209,219 B1 | 4/2001 | Wakefield |
| D441,308 S | 5/2001 | Davis |
| D442,076 S | 5/2001 | Swanson |
| 6,237,243 B1 | 5/2001 | Cook |
| RE37,212 E | 6/2001 | Marshall |
| 6,243,964 B1 | 6/2001 | Murray |
| 6,249,986 B1 | 6/2001 | Murray |
| D447,069 S | 8/2001 | Budrow |
| 6,272,764 B1 | 8/2001 | Lin |
| 6,276,071 B1 | 8/2001 | Khachatoorian |
| D447,712 S | 9/2001 | Hsu |
| 6,282,808 B1 | 9/2001 | Murray |
| 6,308,432 B1 | 10/2001 | Gilliam et al. |
| D451,041 S | 11/2001 | Chen |
| 6,324,769 B1 | 12/2001 | Murray |
| 6,338,204 B1 | 1/2002 | Howle |
| D453,303 S | 2/2002 | Lin |
| 6,349,482 B1 | 2/2002 | Gilliam |
| 6,367,161 B1 | 4/2002 | Murray et al. |
| D458,163 S | 6/2002 | Kang |
| D458,550 S | 6/2002 | Hsu |
| 6,431,486 B1 | 8/2002 | Lee |
| D463,300 S | 9/2002 | Li |
| 6,442,863 B1 | 9/2002 | Poineau et al. |
| 6,449,866 B1 | 9/2002 | Murray |
| D464,277 S | 10/2002 | Tarver |
| D464,579 S | 10/2002 | Martone |
| 6,470,582 B1 | 10/2002 | Renko |
| 6,470,590 B1 | 10/2002 | Lee |
| 6,490,809 B1 | 12/2002 | Li |
| 6,497,050 B1 | 12/2002 | Ricalde |
| 6,499,226 B1 | 12/2002 | Reda et al. |
| D469,704 S | 2/2003 | Williams et al. |
| RE38,032 E | 3/2003 | Butwin |
| D471,473 S | 3/2003 | Blackman et al. |
| D471,827 S | 3/2003 | Ranieri et al. |
| 6,530,159 B2 | 3/2003 | Tarver |
| 6,543,144 B1 | 4/2003 | Morin |
| 6,546,644 B2 | 4/2003 | Poineau et al. |
| D474,412 S | 5/2003 | Ichinose et al. |
| 6,568,099 B2 | 5/2003 | Bergeron |
| D476,913 S | 7/2003 | Blackman et al. |
| 6,595,451 B1 | 7/2003 | Kang et al. |
| 6,598,310 B1 | 7/2003 | Odachowski |
| 6,637,124 B2 | 10/2003 | Pederson |
| 6,637,126 B2 | 10/2003 | Balota |
| 6,643,947 B2 | 11/2003 | Murray |
| D485,770 S | 1/2004 | Lee |
| D486,086 S | 2/2004 | Jueneman |
| 6,684,522 B2 | 2/2004 | Chilton |
| 6,688,010 B1 | 2/2004 | Schwaerzler |
| 6,691,426 B1 | 2/2004 | Lee et al. |
| 6,694,622 B2 | 2/2004 | Kim |
| 6,698,679 B1 | 3/2004 | Critelli et al. |
| 6,718,649 B1 | 4/2004 | Critelli et al. |
| 6,760,979 B1 | 7/2004 | Hsu |
| 6,796,052 B1 | 9/2004 | Lin |
| 6,804,899 B2 | 10/2004 | Murray |
| 6,811,109 B1 | 11/2004 | Blackman et al. |
| 6,836,975 B2 | 1/2005 | Lin |
| 6,839,981 B2 | 1/2005 | Rafter |
| 6,854,197 B2 | 2/2005 | Knight |
| D503,351 S | 3/2005 | Chien |
| D503,637 S | 4/2005 | Noel |
| D503,897 S | 4/2005 | Lin |
| 6,874,245 B2 | 4/2005 | Liu |
| D504,628 S | 5/2005 | Weeks et al. |
| D504,835 S | 5/2005 | Snider |
| D504,836 S | 5/2005 | Wang |
| 6,892,468 B2 | 5/2005 | Murray |
| 6,904,697 B2 | 6/2005 | Zars |
| D507,195 S | 7/2005 | Kondo et al. |
| 6,918,191 B2 | 7/2005 | Stauffer et al. |
| 6,920,700 B2 | 7/2005 | Ekdahl et al. |
| 6,931,734 B2 | 8/2005 | Elder et al. |
| 6,931,753 B2 | 8/2005 | Ryals et al. |
| 6,935,045 B2 | 8/2005 | Cubbedge |
| 6,938,354 B2 | 9/2005 | Worthington |
| 6,944,961 B2 | 9/2005 | Carroll |
| 6,959,499 B2 | 11/2005 | Bini |
| 6,962,002 B2 | 11/2005 | Panosian |
| D514,962 S | 2/2006 | Armendariz |
| 6,996,915 B2 | 2/2006 | Ricalde |
| 7,024,791 B2 | 4/2006 | Marshall et al. |
| D522,890 S | 6/2006 | Huang |
| 7,055,260 B1 | 6/2006 | Hoffman |
| 7,057,484 B2 | 6/2006 | Gilmore |
| 7,059,061 B2 | 6/2006 | French |
| 7,131,214 B1 | 11/2006 | Blackman et al. |
| 7,131,215 B2 | 11/2006 | Kang |
| 7,134,214 B1 * | 11/2006 | Manning .......................... 33/483 |
| D535,900 S | 1/2007 | McKinney |
| 7,159,331 B2 | 1/2007 | Critelli et al. |
| 7,168,182 B2 | 1/2007 | Kilpatrick et al. |
| 7,174,655 B1 | 2/2007 | Gibbons et al. |
| 7,174,656 B1 | 2/2007 | Smith |
| 7,178,257 B2 | 2/2007 | Kang et al. |
| 7,185,445 B2 * | 3/2007 | Rhead ............................. 33/755 |
| 7,185,446 B1 | 3/2007 | King |
| 7,191,532 B2 * | 3/2007 | Long et al. ...................... 33/286 |
| D540,207 S | 4/2007 | Ikeda |
| 7,234,246 B1 | 6/2007 | Rhead |
| RE39,719 E | 7/2007 | Murray |
| D545,701 S | 7/2007 | Cooper |
| D547,681 S | 7/2007 | Nelson et al. |
| 7,240,439 B2 | 7/2007 | Critelli et al. |
| 7,260,895 B2 * | 8/2007 | Long et al. ...................... 33/286 |
| 7,260,899 B2 * | 8/2007 | Jones .............................. 33/760 |
| 7,284,339 B1 | 10/2007 | Campbell et al. |
| 7,299,565 B2 | 11/2007 | Marshall et al. |
| D557,155 S | 12/2007 | Sa'ar |
| D558,620 S | 1/2008 | Critelli et al. |
| D560,522 S | 1/2008 | Farnworth et al. |
| 7,334,344 B2 | 2/2008 | Scarborough |
| 7,343,694 B2 | 3/2008 | Erdfarb |
| D565,441 S | 4/2008 | Critelli |
| D565,442 S | 4/2008 | Critelli |
| 7,353,619 B2 | 4/2008 | Gibbons et al. |
| 7,363,723 B1 | 4/2008 | Peterson |
| 7,377,050 B2 | 5/2008 | Shute et al. |
| 7,398,604 B2 | 7/2008 | Murray |
| 7,406,778 B2 | 8/2008 | Lee et al. |
| 7,415,777 B2 | 8/2008 | Campbell et al. |
| 7,415,778 B1 | 8/2008 | McEwan et al. |
| D579,359 S | 10/2008 | Critelli et al. |
| 7,434,330 B2 | 10/2008 | McEwan et al. |
| 7,454,845 B2 | 11/2008 | Wise |
| D582,810 S | 12/2008 | Cook |
| 7,458,537 B2 | 12/2008 | Critelli et al. |
| 7,475,842 B2 | 1/2009 | Campbell |
| 7,487,600 B1 | 2/2009 | Cooper |
| 7,490,414 B2 | 2/2009 | Critelli et al. |
| 7,490,415 B1 | 2/2009 | Cubbedge |
| D590,283 S | 4/2009 | Critelli et al. |
| D590,284 S | 4/2009 | Critelli et al. |
| 7,555,845 B2 | 7/2009 | Critelli et al. |
| 7,559,154 B2 | 7/2009 | Levine et al. |
| 7,565,751 B2 | 7/2009 | Murray |
| 7,594,341 B2 | 9/2009 | Erdfarb |
| D603,248 S | 11/2009 | Bar-Erez |
| 7,617,616 B1 | 11/2009 | Berg |
| 7,627,958 B2 | 12/2009 | Tallon et al. |
| 7,631,437 B2 | 12/2009 | Sanderson |
| D611,849 S | 3/2010 | Cook et al. |
| 7,669,347 B1 | 3/2010 | Huang |
| D613,629 S | 4/2010 | Suzuki |
| D614,516 S | 4/2010 | Capra |
| 7,703,216 B2 | 4/2010 | Huang |
| D617,224 S | 6/2010 | Delneo et al. |
| 7,805,855 B2 | 10/2010 | Seo |
| 7,845,093 B2 | 12/2010 | Smiroldo |

(56) References Cited

U.S. PATENT DOCUMENTS

| | | |
|---|---|---|
| 7,846,673 B2 | 12/2010 | Pastorek et al. |
| 7,854,074 B2 | 12/2010 | Zhou |
| 7,913,406 B2 | 3/2011 | Norelli |
| 7,918,037 B1 | 4/2011 | Polkhovskiy |
| 7,987,611 B2 | 8/2011 | Taylor |
| 8,015,723 B2 | 9/2011 | Solomon |
| 8,056,849 B2 | 11/2011 | Ng et al. |
| 8,081,815 B2 | 12/2011 | Kotake |
| D653,974 S | 2/2012 | Capra |
| 8,117,762 B2 | 2/2012 | Delneo et al. |
| 8,117,763 B2 | 2/2012 | Delneo et al. |
| D660,735 S | 5/2012 | Petrillo |
| 8,215,027 B2 | 7/2012 | Kang |
| 8,375,595 B2 | 2/2013 | Murray et al. |
| 8,381,411 B2 | 2/2013 | Delarosa et al. |
| 8,407,909 B2 | 4/2013 | Lindsay |
| 2001/0003872 A1 | 6/2001 | Pederson |
| 2001/0042315 A1 | 11/2001 | Dixon |
| 2002/0011008 A1 | 1/2002 | Nelson et al. |
| 2002/0066193 A1 | 6/2002 | Hodge |
| 2002/0066774 A1 | 6/2002 | Prochac |
| 2002/0073562 A1* | 6/2002 | Brink ............... 33/293 |
| 2002/0073570 A1 | 6/2002 | Conder |
| 2003/0009899 A1 | 1/2003 | Ha |
| 2003/0019116 A1 | 1/2003 | Dewall |
| 2003/0019123 A1 | 1/2003 | Lin |
| 2003/0070315 A1 | 4/2003 | Bergeron |
| 2003/0213141 A1 | 11/2003 | Lin |
| 2003/0233762 A1 | 12/2003 | Blackman et al. |
| 2004/0044438 A1 | 3/2004 | Lorraine et al. |
| 2004/0055174 A1 | 3/2004 | Hirsch, Jr. |
| 2004/0071869 A1 | 4/2004 | Gilliam et al. |
| 2004/0088875 A1 | 5/2004 | Lee et al. |
| 2004/0163267 A1 | 8/2004 | Bini |
| 2004/0163271 A1 | 8/2004 | Zars |
| 2004/0163272 A1 | 8/2004 | Knight |
| 2005/0005470 A1 | 1/2005 | Snider |
| 2005/0028396 A1 | 2/2005 | Stauffer et al. |
| 2005/0155244 A1 | 7/2005 | Ryals et al. |
| 2005/0155245 A1 | 7/2005 | Panosian |
| 2005/0252020 A1 | 11/2005 | Critelli et al. |
| 2005/0252021 A1 | 11/2005 | Kang |
| 2006/0010705 A1 | 1/2006 | Dettellis |
| 2006/0037203 A1* | 2/2006 | Long et al. ............... 33/286 |
| 2006/0042111 A1* | 3/2006 | Hoopengarner ............... 33/760 |
| 2006/0096112 A1 | 5/2006 | Berring |
| 2006/0096113 A1 | 5/2006 | Kang et al. |
| 2006/0107546 A1 | 5/2006 | Pritchard |
| 2006/0130352 A1 | 6/2006 | Huang |
| 2006/0185185 A1 | 8/2006 | Scarborough |
| 2006/0230627 A1 | 10/2006 | Blackman et al. |
| 2006/0248742 A1* | 11/2006 | Marshall et al. ............... 33/768 |
| 2006/0283036 A1 | 12/2006 | Huang |
| 2007/0017111 A1* | 1/2007 | Hoback et al. ............... 33/771 |
| 2007/0056182 A1 | 3/2007 | Di Bitonto et al. |
| 2007/0079520 A1 | 4/2007 | Levine et al. |
| 2007/0152091 A1 | 7/2007 | Campbell |
| 2007/0171630 A1 | 7/2007 | Gibbons et al. |
| 2007/0227028 A1 | 10/2007 | Campbell et al. |
| 2008/0028628 A1 | 2/2008 | Campbell et al. |
| 2008/0086902 A1 | 4/2008 | Murray |
| 2008/0086903 A1 | 4/2008 | Peterson |
| 2008/0086904 A1 | 4/2008 | Murray |
| 2008/0285854 A1 | 11/2008 | Kotake et al. |
| 2009/0064517 A1 | 3/2009 | Sanderson |
| 2009/0064525 A1 | 3/2009 | Chen |
| 2009/0064526 A1 | 3/2009 | Farnworth et al. |
| 2009/0249636 A1 | 10/2009 | Reda et al. |
| 2010/0139110 A1 | 6/2010 | Germain |
| 2010/0314277 A1 | 12/2010 | Murray |
| 2010/0325910 A1 | 12/2010 | Huang |
| 2011/0005094 A1 | 1/2011 | Solomon |
| 2011/0138642 A1 | 6/2011 | Norelli |
| 2011/0179661 A1 | 7/2011 | Delneo et al. |
| 2011/0179663 A1 | 7/2011 | Kang |
| 2011/0179664 A1 | 7/2011 | Delneo et al. |
| 2012/0036727 A1 | 2/2012 | McCarthy |
| 2012/0055038 A1 | 3/2012 | Lindsay |
| 2012/0073156 A1 | 3/2012 | Delarosa et al. |
| 2012/0159799 A1 | 6/2012 | Murray et al. |
| 2012/0167403 A1 | 7/2012 | Roeske |
| 2013/0025147 A1 | 1/2013 | Steele et al. |
| 2013/0025148 A1 | 1/2013 | Steele et al. |
| 2013/0047455 A1 | 2/2013 | Steele et al. |
| 2013/0185949 A1* | 7/2013 | Burch et al. ............... 33/768 |

FOREIGN PATENT DOCUMENTS

| | | |
|---|---|---|
| DE | 102006058396 B4 | 6/2011 |
| EP | 66322 | 10/1986 |
| EP | 0199430 | 10/1986 |
| EP | 531570 | 3/1993 |
| EP | 427932 | 2/1996 |
| EP | 0724133 | 7/1996 |
| EP | 0896200 A2 | 2/1999 |
| EP | 0896200 A3 | 12/1999 |
| EP | 1074813 | 2/2001 |
| EP | 1175840 | 1/2002 |
| EP | 1411319 | 4/2004 |
| EP | 1144947 | 9/2004 |
| EP | 1469276 | 10/2004 |
| EP | 1104542 | 12/2004 |
| EP | 1553382 | 7/2005 |
| EP | 0922196 | 11/2005 |
| EP | 1647797 | 4/2006 |
| EP | 1237431 | 10/2006 |
| EP | 1914508 | 4/2008 |
| EP | 1914509 | 4/2008 |
| EP | 2469218 | 6/2012 |
| GB | 690458 | 4/1953 |
| JP | 1961002384 | 2/1961 |
| JP | 1983134704 | 9/1983 |
| JP | 10332301 | 12/1998 |
| KR | 19840001901 | 9/1984 |
| KR | 19910004712 | 11/1991 |
| WO | WO 9402799 | 2/1994 |
| WO | WO 9714541 | 4/1997 |
| WO | WO 98/09133 | 3/1998 |
| WO | WO 9811402 | 3/1998 |
| WO | WO 98/23524 | 6/1998 |
| WO | WO 99/23447 | 5/1999 |
| WO | WO 00/09969 | 2/2000 |
| WO | WO 0060306 | 10/2000 |
| WO | WO 02057710 | 7/2002 |
| WO | WO 03/031903 | 4/2003 |
| WO | WO 2005/008171 | 1/2005 |
| WO | WO 2007/059353 | 5/2007 |
| WO | WO 2007/059354 | 5/2007 |
| WO | WO 2007/126960 | 11/2007 |

* cited by examiner

TAPE MEASURE

CROSS-REFERENCE TO RELATED APPLICATIONS

This application claims priority to U.S. Provisional Patent Application No. 61/588,459, filed Jan. 19, 2012, the entire contents of which are incorporated by reference herein.

BACKGROUND

The present invention relates to measurement devices, and in particular, the invention relates to a tape measure.

Tape measures are used for a variety of measuring tasks, and in various environments. In order to take accurate measurements, a user must compare the item being measured to indicia printed onto the tape. The indicia may be difficult to read where there is little ambient light.

SUMMARY

In one embodiment, the invention provides a tape measure. The tape measure includes a housing assembly having a first side wall, a second side wall, and a peripheral wall extending from the first side wall to the second side wall. The housing assembly defines a cavity, and the peripheral wall defines a bottom surface and a tape port. A measuring tape is rotatably supported by the housing. At least a portion of the measuring tape forms a spool disposed within the cavity. The measuring tape extends and retracts from the cavity through the tape port. A hook member is fixedly coupled to an end portion of the measuring tape. A first lamp is coupled to the housing assembly and is oriented to illuminate a portion of the measuring tape.

In another embodiment, the invention provides a tape measure. The tape measure includes a housing assembly having a first side wall, a second side wall, and a peripheral wall extending from the first side wall to the second side wall. The housing assembly defines a cavity, and the peripheral wall defines a bottom surface and a tape port. A measuring tape is rotatably supported by the housing. At least a portion of the measuring tape forms a spool disposed within the cavity. The measuring tape extends and retracts from the cavity through the tape port. A hook member is fixedly coupled to an end portion of the measuring tape, and a battery compartment is defined within the housing assembly for receiving a battery. A light system is coupled to the housing assembly. The light system includes a first lamp, a second lamp, and a third lamp partially disposed within the housing assembly. The first lamp is oriented to illuminate a first portion of the measuring tape. The second lamp and the third lamp are each oriented to illuminate a second portion of the measuring tape.

In yet another embodiment, the invention provides a tape measure. The tape measure includes a housing assembly including a first side wall, a second side wall, and a peripheral wall extending from the first side wall to the second side wall. The housing assembly defines a cavity, and the peripheral wall defines a bottom surface and a tape port. A measuring tape having a fluorescent surface coating is rotatably supported by the housing. At least a portion of the measuring tape forms a spool disposed within the cavity. The measuring tape extends and retracts from the cavity through the tape port. A hook member is fixedly coupled to an end portion of the measuring tape, and a battery compartment is defined within the housing assembly for receiving a battery. A light system is coupled to the housing assembly and includes at least one ultra-violet lamp for illuminating a portion of the measuring tape.

Other aspects of the invention will become apparent by consideration of the detailed description and accompanying drawings.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

Figure 1:
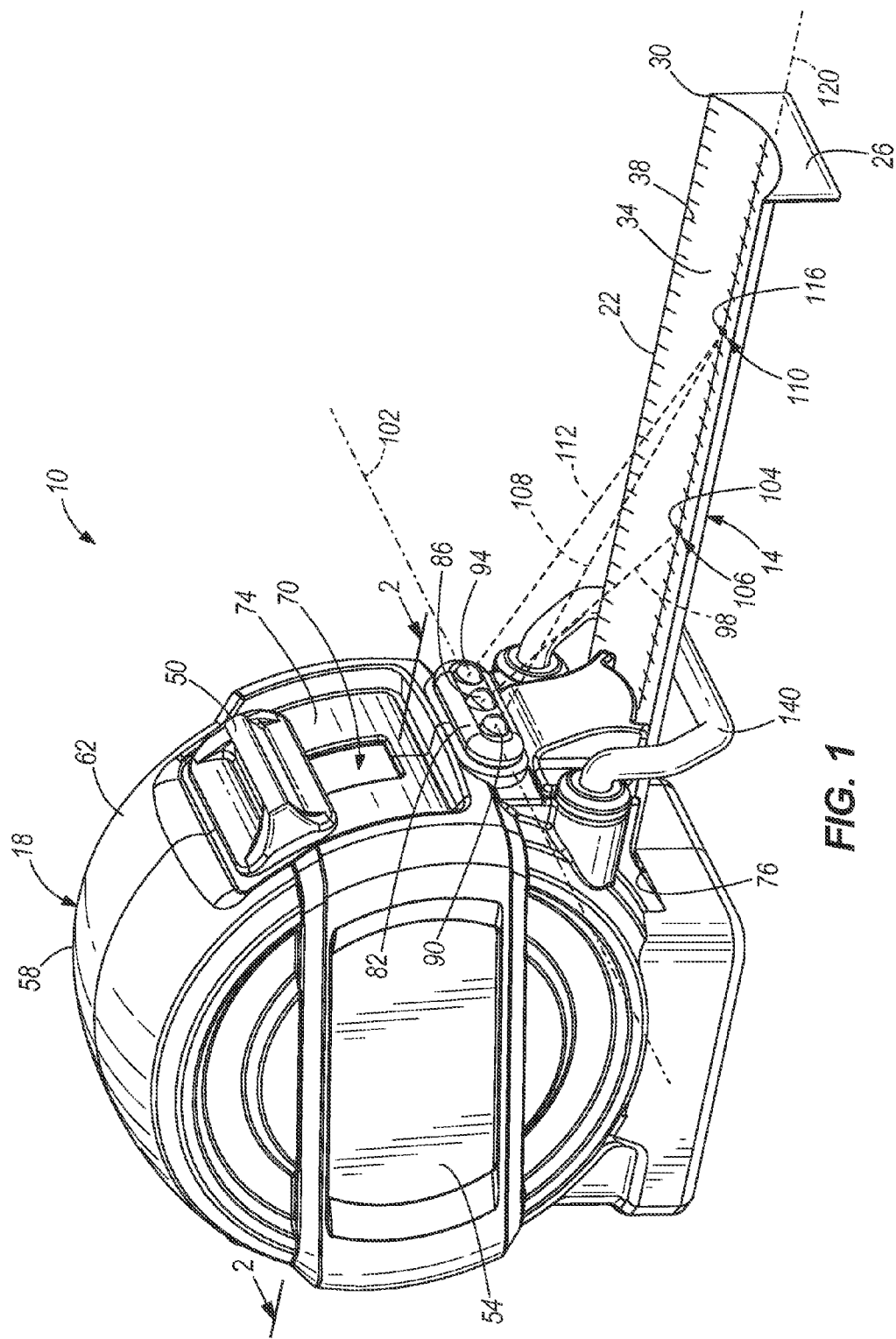
FIG. 1 is a perspective view of a tape measure according to one construction of the invention.
Figure 2:
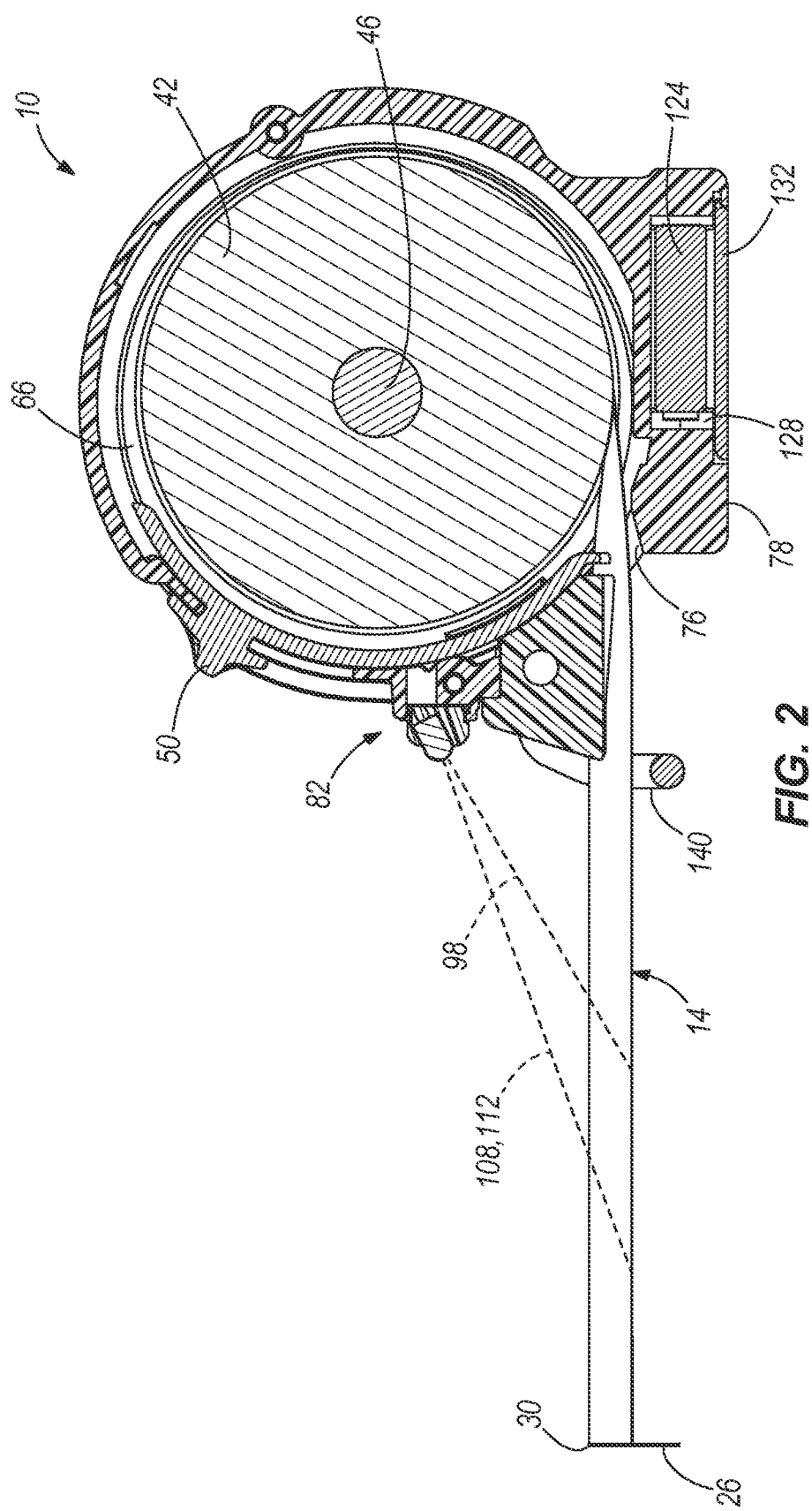
FIG. 2 is a cross-sectional view, along section line 2-2, of the tape measure shown in FIG. 1.

FIGS. 1 and 2 illustrate a length measurement device, more specifically, a tape measure 10. The tape measure 10 includes a coilable measuring tape 14 and a housing assembly 18.

As illustrated in FIG. 1, a variable-length extended segment 22 of the measuring tape 14 is retractable and extendable from the housing assembly 18. A hook member 26 is fixedly coupled to an end portion 30 of the measuring tape 14. A top surface 34 of the tape 14 includes indicia 38 for taking measurements. In some embodiments, the indicia 38 may be defined in a fluorescent coating applied to the top surface 34, or a fluorescent coating or layer may be applied over the indicia 38.

Referring to FIG. 2, the remainder of the measuring tape 14 forms a spool 42 disposed within the housing assembly 18. A retraction mechanism 46 is coupled to the spool 42 to provide for powered retraction of the measuring tape 14. The retraction mechanism 46 may include an elongated coiled spring for motive force. Referring to FIGS. 1 and 2, a tape lock 50 is provided to selectively engage at least one of the spool 42 and the refraction mechanism 46, such that the extended segment 22 of the measuring tape 14 remains at a desired length.

Figure 3:
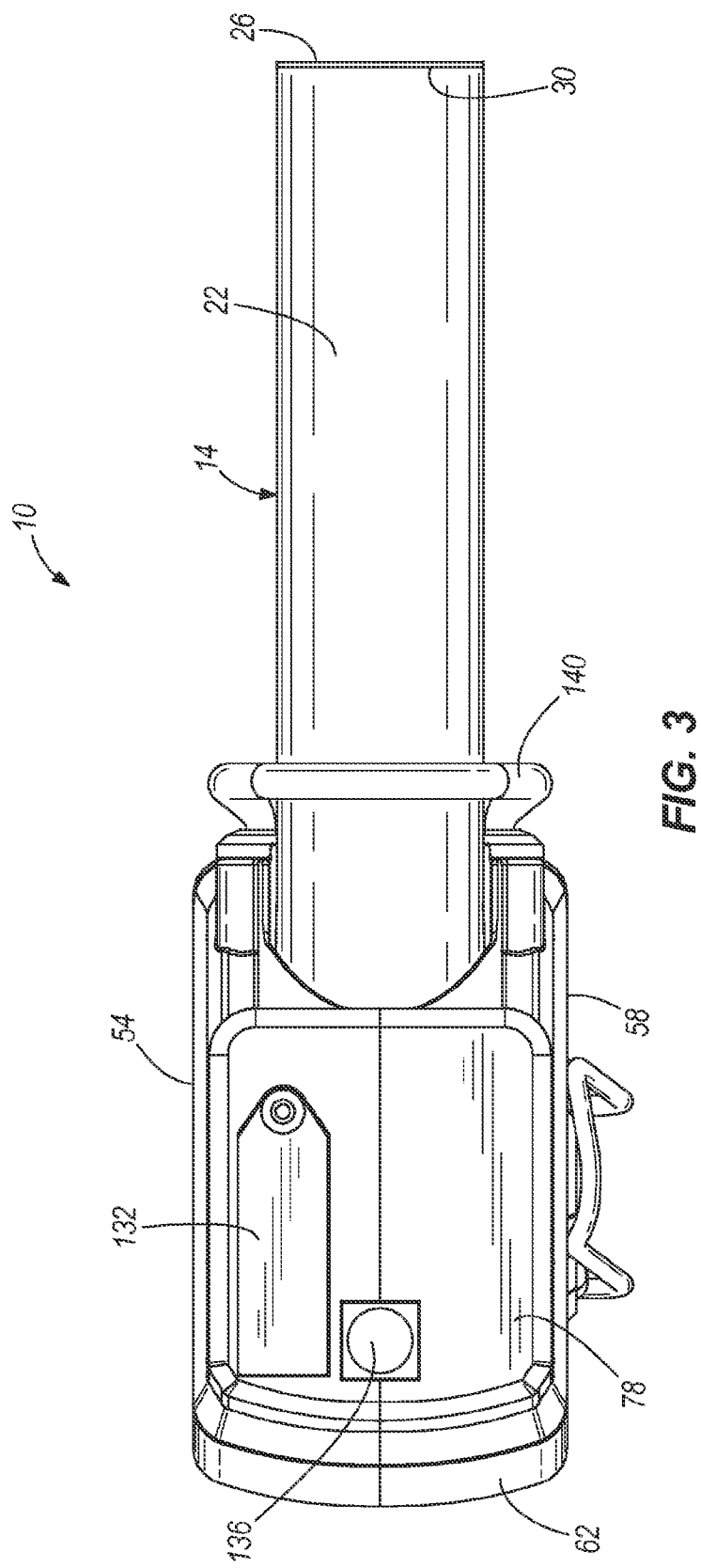
FIG. 3 is a bottom view of the tape measure shown in FIG. 1.

Referring to FIGS. 1 and 3, the housing assembly 18 includes a first side wall 54, a second side wall 58, and a peripheral wall 62 connecting the first side wall 54 and the second side wall 58. Referring to FIG. 1, each of the first side wall 54 and the second side wall 58 has a substantially circular profile. In other embodiments, the side walls 54 and 58 may be rectangular or another polygonal shape. Portions of the housing assembly 18 may be co-molded or separately formed of a resilient material, such as a natural or synthetic rubber, forming housing bumpers. Referring to FIG. 2, the housing assembly defines an internal cavity 66 in which the spool 42 and retraction mechanism 46 are rotatable about an axis.

Referring to FIG. 1, a slot 70 is defined along a forward portion 74 of the peripheral wall 62. The slot 70 is provided to allow for sliding movement of the tape lock 50 relative to housing assembly 18. Below the slot 70, a tape port 76 is provided in the peripheral wall 62. The tape port 76 allows for the retraction and extension of the measuring tape 14 to and from the internal cavity 66.

Referring to FIG. 3, the peripheral wall 62 further defines a bottom surface 78. The bottom surface 78 is substantially planar, thereby allowing the tape measure 10 to rest in an upright position upon the bottom surface 78 (FIG. 1).

Referring to FIG. 1, between the tape port 76 and the slot 70, a light system 82 is coupled to the housing assembly 18. In the illustrated construction, the light system 82 includes three lamps: a center lamp 86, a first outboard lamp 90, and a second outboard lamp 94. The lamps 86, 90, and 94 in the illustrated construction include ultra-violet light emitting diodes (UV LEDs). In other constructions, other types of lamps may be used, including incandescent types, and fewer or more lamps may be used. The lamps 86, 90, and 94 are aligned along a common axis 102 and are partially exposed from the housing assembly 18.

Each of the three lamps 86, 90, and 94 is oriented to direct a beam upon the extended segment 22 of the measuring tape 14. The center lamp 86 directs a center beam 98 upon a point 104 approximately two inches from the housing assembly 18 and is oriented to illuminate a first portion 106 of the measuring tape. The first outboard lamp 90 and the second outboard lamp 94 direct a first outboard beam 108 and a second outboard 112 beam upon a point 116 approximately four inches from the housing assembly 18. The first outboard lamp 90 and the second outboard lamp 94 are oriented to illuminate a second portion 110 of the measuring tape. All three beams 98, 108, and 112 intersect the extended segment 22 along a center axis 120 of the extended segment 22. Where the measuring tape 14 includes a fluorescent coating, UV light from the UV LEDs of the lamps 86, 90, and 94 causes the measuring tape 14 to glow, allowing for easier viewing of the indicia. In other constructions, the lamps 86, 90, and 94 may be oriented in other directions or upon other points.

Referring to FIG. 2, the lamps 86, 90, 94 are powered by a battery 124 disposed within a battery compartment 128 defined by the housing assembly 18. The battery 124 may be, for example, an A23-type 12 volt battery. Referring to FIG. 3, the battery compartment 128 is enclosed by a detachable battery cover 132 that is coupled to the bottom surface 78 of the housing assembly. The battery cover 132 may include a seal member in order to provide a degree of weather-resistance to the battery compartment 128.

Adjacent the battery cover 132, a light switch 136 is coupled to the bottom surface 78 of the housing assembly 18. The light switch 136 is positioned to allow a user to engage the light switch 136 while holding the tape measure 10 in a position of use, such as when taking measurements. The light switch 136 may act as a simple ON/OFF switch between the battery 124 and the light system 82, where all of the lamps 86, 90, and 94 are either simultaneously ON or simultaneously OFF. The light switch 136 may additionally be actuated by extension and retraction of the measuring tape 14 from the housing assembly 18. For example, extension of the measuring tape 14 from the housing assembly 18 may cause the light system 82 to turn ON, while refraction of the measuring tape from the housing assembly may cause the light system 82 to turn off. In other constructions, the light switch 136 may be a user input for a controller that allows for various combinations of the lamps to be illuminated in one or more modes, such as continuous and flashing.

Referring to FIGS. 1 and 2, a guard member 140 is coupled to the housing assembly 18 adjacent the tape port 76. As shown in FIG. 2, the guard member 140 is U-shaped and is configured to engage the hook member 26 when the measuring tape 14 is fully retracted.

The guard member 140 shields a user's fingers from being struck by the hook member 26 when the measuring tape 14 is rapidly retracted into the internal cavity 66. The guard member 140 also shields the housing assembly 18 from being struck by the hook member 26.

Thus, the invention provides, among other things, a tape measure. Various features and advantages of the invention are set forth in the following claims.

We claim:

1. A tape measure comprising:
   a housing assembly including a first side wall, a second side wall, and a peripheral wall extending from the first side wall to the second side wall, the housing assembly defining a cavity, and the peripheral wall defining a bottom surface and a tape port;
   a measuring tape, wherein at least a portion of the measuring tape forms a spool disposed within the cavity and rotatably supported by the housing, the measuring tape extending and retracting from the cavity through the tape port;
   a hook member fixedly coupled to an end portion of the measuring tape; and
   a first lamp coupled to the housing assembly and oriented to illuminate a portion of the measuring tape, wherein a light switch is coupled to the housing assembly, the light switch configured to selectively actuate the lamp between an ON condition and an OFF condition, and wherein the light switch is actuated by extension and retraction of the measuring tape from the housing assembly.

2. The tape measure of claim 1, wherein the housing assembly further defines a battery compartment for receiving a battery.

3. The tape measure of claim 1, wherein the first lamp directs a first beam to a point approximately two inches from the housing assembly.

4. The tape measure of claim 1, further comprising a second lamp coupled to the housing.

5. The tape measure of claim 4, wherein the first lamp directs a first beam to a first point, and the second lamp directs a second beam to a second point separate from the first point.

6. The tape measure of claim 5, wherein the first point is approximately two inches from the housing assembly, and the second point is approximately 4 inches from the housing assembly.

7. The tape measure of claim 5, wherein the first beam and the second beam intersect an extended segment of the measuring tape along a center axis.

8. The tape measure of claim 1, wherein the first lamp includes an ultra-violet light emitting diode.

9. The tape measure of claim 1, wherein the measuring tape includes a fluorescent coating.

10. A tape measure comprising:
    a housing assembly including a first side wall, a second side wall, and a peripheral wall extending from the first side wall to the second side wall, the housing assembly defining a cavity, and the peripheral wall defining a bottom surface and a tape port;
    a measuring tape, wherein at least a portion of the measuring tape forms a spool disposed within the cavity and rotatably supported by the housing, the measuring tape extending and retracting from the cavity through the tape port;
    a hook member fixedly coupled to an end portion of the measuring tape;
    a battery compartment defined within the housing assembly for receiving a battery; and
    a light system coupled to the housing assembly, wherein the light system includes a first lamp, a second lamp, and a third lamp partially disposed within the housing assembly, the first lamp oriented to illuminate a first portion of the measuring tape, and the second lamp and the third lamp oriented to illuminate a second portion of the measuring tape, wherein the first lamp directs a first beam, the second lamp directs a second beam, and the third lamp directs a third beam, the first beam, the second beam, and the third beam intersecting a center axis of an extended segment of the measuring tape.

11. The tape measure of claim 10, wherein a light switch is coupled to the housing assembly, the light switch configured to selectively operate the light system between an ON condition and an OFF condition.

12. The tape measure of claim 10, wherein the first lamp, the second lamp, and the third lamp are disposed along a lamp axis.

13. The tape measure of claim 10, wherein the first lamp, the second lamp, and the third lamp each include ultra-violet light emitting diodes.

14. The tape measure of claim 10, wherein the measuring tape includes a fluorescent coating.

15. A tape measure comprising:
a housing assembly including a first side wall, a second side wall, and a peripheral wall extending from the first side wall to the second side wall, the housing assembly defining a cavity, and the peripheral wall defining a bottom surface and a tape port;
a measuring tape, wherein at least a portion of the measuring tape forms a spool disposed within the cavity and rotatably supported by the housing, the measuring tape extending and retracting from the cavity through the tape port;
a hook member fixedly coupled to an end portion of the measuring tape;
a battery compartment defined within the housing assembly for receiving a battery; and
a light system coupled to the housing assembly, wherein the light system includes a first lamp, a second lamp, and a third lamp partially disposed within the housing assembly, the first lamp oriented to illuminate a first portion of the measuring tape, and the second lamp and the third lamp oriented to illuminate a second portion of the measuring tape wherein the first lamp directs a first beam to a point approximately two inches from the housing assembly, and wherein the second lamp directs a second beam and the third lamp directs a third beam, the second beam and the third beam directed to a point approximately four inches from the housing assembly.

* * * * *